US010924773B2

(12) United States Patent
Xie et al.

(10) Patent No.: US 10,924,773 B2
(45) Date of Patent: Feb. 16, 2021

(54) METHOD FOR DIVERTING LIVE VIDEO STREAM, CCL SERVER AND SYSTEM

(71) Applicant: WANGSU SCIENCE & TECHNOLOGY CO., LTD., Shanghai (CN)

(72) Inventors: Linxin Xie, Shanghai (CN); Xi Cai, Shanghai (CN); Longshi Cai, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 320 days.

(21) Appl. No.: 16/300,640

(22) PCT Filed: Jun. 14, 2018

(86) PCT No.: PCT/CN2018/091205
§ 371 (c)(1),
(2) Date: Nov. 12, 2018

(87) PCT Pub. No.: WO2019/214009
PCT Pub. Date: Nov. 14, 2019

(65) Prior Publication Data
US 2020/0322646 A1    Oct. 8, 2020

(30) Foreign Application Priority Data
May 10, 2018  (CN) .......................... 2018 1 0443631

(51) Int. Cl.
*H04N 7/173*    (2011.01)
*H04N 21/2187*    (2011.01)
(Continued)

(52) U.S. Cl.
CPC ......... *H04N 21/2187* (2013.01); *H04L 67/26* (2013.01); *H04N 21/2393* (2013.01); *H04N 21/262* (2013.01); *H04N 21/439* (2013.01)

(58) Field of Classification Search
CPC ........... H04N 21/2187; H04N 21/2393; H04N 21/262; H04N 21/439; H04N 21/2223;
(Continued)

(56) References Cited

U.S. PATENT DOCUMENTS 7,133,905 B2 *  11/2006  Dilley ................... H04L 29/06
                                                         709/219
8,234,275 B2 *  7/2012  Grant ................. G06Q 30/0277
                                                         707/732
(Continued)

FOREIGN PATENT DOCUMENTS

CN          107707926 A     2/2018

OTHER PUBLICATIONS

The European Patent Office (EPO) The Extended European Search Report for 18821977.8 dated Aug. 7, 2019 12 Pages.

*Primary Examiner* — Michael B. Pierorazio
(74) *Attorney, Agent, or Firm* — Anova Law Group, PLLC (57) ABSTRACT

A method for diverting a live video stream includes: a target stream-pushing edge node receives and maintains a target live video stream pushed by an anchor terminal, and reports video stream information of the target live video stream to the CCL server through a locally deployed CCL proxy; when a stream-pulling request of the target live video stream sent by a target static parent node is received, a dynamic parent node M determines whether the target live video stream is maintained locally; if the target live video stream is not maintained locally, the dynamic parent node M determines the target stream-pushing edge node from the CCL server through a locally deployed CCL proxy; and the dynamic parent node M pulls the target live video stream from the target stream-pushing edge node and feeds back the target live video stream to the target static parent node.

12 Claims, 6 Drawing Sheets

(51) Int. Cl.
*H04L 29/08* (2006.01)
*H04N 21/239* (2011.01)
*H04N 21/262* (2011.01)
*H04N 21/439* (2011.01)

(58) Field of Classification Search
CPC ........... H04N 21/2183; H04N 21/2181; H04N 21/231
USPC ........................................................ 725/116
See application file for complete search history.

(56) References Cited

U.S. PATENT DOCUMENTS

| | | | | |
|---|---|---|---|---|
| 8,386,321 B2* | 2/2013 | Grant | ................ | G06Q 30/0241 |
| | | | | 705/14.73 |
| 8,554,630 B2* | 10/2013 | Grant | ................ | G06Q 30/0282 |
| | | | | 705/14.73 |
| 8,898,161 B2* | 11/2014 | Grant | ................ | G06F 16/9535 |
| | | | | 707/735 |
| 9,843,624 B1* | 12/2017 | Taaghol | ............... | H04L 41/0803 |
| 9,996,616 B2* | 6/2018 | Grant | .................... | G06Q 30/01 |
| 2014/0365613 A1* | 12/2014 | Phillips | ............ | H04N 21/64784 |
| | | | | 709/219 |
| 2015/0074232 A1* | 3/2015 | Phillips | ................... | H04L 65/60 |
| | | | | 709/219 |
| 2015/0100664 A1* | 4/2015 | Flack | ...................... | H04L 67/28 |
| | | | | 709/213 |
| 2015/0127844 A1* | 5/2015 | Phillips | ................... | H04L 67/22 |
| | | | | 709/231 |
| 2015/0249622 A1* | 9/2015 | Phillips | ............... | H04L 65/4084 |
| | | | | 709/219 |
| 2015/0249623 A1* | 9/2015 | Phillips | ................... | H04L 47/74 |
| | | | | 709/219 |
| 2017/0201571 A1* | 7/2017 | Sherf | ................. | H04L 43/0817 |

\* cited by examiner

METHOD FOR DIVERTING LIVE VIDEO STREAM, CCL SERVER AND SYSTEM

CROSS-REFERENCES TO RELATED APPLICATIONS

This application is a national phase entry under 35 U.S.C § 371 of International Application No. PCT/CN2018/091205 filed on Jun. 14, 2018, which claims priority of Chinese Patent Application No. 2018104436319, filed with the State Intellectual Property Office of P. R. China on May 10, 2018, the entire contents of all of which are incorporated herein by reference.

FIELD OF DISCLOSURE

The present disclosure generally relates to the field of data transmission technology and, more particularly, relates to a method for diverting a live video stream, a CCL server, and a system thereof.

BACKGROUND

With the development of Internet technology and the continuous acceleration of broadband, the Internet is increasingly connected with people's lives. Watching live streams has become a mainstream of entertainment nowadays. To improve the quality of live streaming service, the operators of live streaming platforms provide live streaming service mostly based on the CDN (Content Delivery Network) cluster.

When recording a live video, an anchor terminal may push the live video stream to a CDN edge node (which may be referred to as "a stream-pushing edge node") that is closest to the anchor terminal. After receiving the live video stream, the stream-pushing edge node may select two dynamic parent nodes in the CDN cluster according to a preset algorithm, and then push the live video stream to these two dynamic parent nodes, so that the two dynamic parent nodes can mutually serve as the active and standby nodes and provide the service for diverting the live video stream. In this way, when a viewer wants to watch the live video stream, the viewer terminal may send an acquisition request for the live video stream to a CDN edge node (which may be referred to as "a stream-pulling edge node") that is closest to the viewer terminal. The stream-pulling edge node may forward the acquisition request of the live video stream to an upper-level static parent node, so that the static parent node may determine a dynamic parent node that maintains the live video stream according to a preset algorithm. Afterwards, the static parent node may pull the stream from the dynamic parent node, and then feed back the live video stream to the viewer terminal through the stream-pulling edge node.

However, the applicants have found that the existing technologies have at least the following problems.

Each live video stream is automatically pushed to two dynamic parent nodes after a live streaming starts. However, some live video streams do not need to occupy the diverting resource of two dynamic parent nodes in many instances, such as at the beginning of a live streaming when no viewer is watching, or when there are only a few viewers watching a live streaming. This will greatly waste the data transmission resource of the CDN cluster and the diverting resource from a stream-pushing edge node to the dynamic parent node.

BRIEF SUMMARY OF THE DISCLOSURE

To solve the problems in the existing technologies, the embodiments of the present disclosure provides a method for diverting a live video stream, a CCL (Cache Content Location) server, and a system thereof. The technical solutions are as follows.

In one aspect, a method for diverting a live video stream is provided. The method is applied to a CDN cluster, where each node of the CDN cluster is deployed with a CCL proxy. The method includes:

receiving and maintaining, by a target stream-pushing edge node, a target live video stream pushed by an anchor terminal, and reporting, by the target stream-pushing edge node, video stream information of the target live video stream to a CCL server through a locally deployed CCL proxy of the target stream-pushing edge node;

when a stream-pulling request of the target live video stream sent by a target static parent node is received, determining, by a dynamic parent node M, whether the target live video stream is maintained locally;

if the target live video stream is not maintained locally, sending, by the dynamic parent node M, the video stream information of the target live video stream to the CCL server through a locally deployed CCL proxy of the dynamic parent node M;

receiving, by the dynamic parent node M, node identification information of the target stream-pushing edge node sent by the CCL server; and pulling, by the dynamic parent node M, the target live video stream from the target stream-pushing edge node according to the node identification information, and feeding back, by the dynamic parent node M, the target live video stream to the target static parent node.

Optionally, the method further includes:

determining, by the target stream-pushing edge node, an anchor level corresponding to the target live video stream;

if the anchor level is greater than a preset active stream-pushing level, determining, by the target stream-pushing edge node, a dynamic parent node N according to a preset algorithm and the video stream information of the target live video stream; and pushing, by the target stream-pushing edge node, the target live video stream to the dynamic parent node N.

Optionally, the method further includes:

receiving, by the target static parent node, the stream-pulling request of the target live video stream sent by a target stream-pulling edge node;

determining, by the target static parent node, at least one dynamic parent node according to a preset algorithm and the video stream information of the target live video stream; and detecting, by the target static parent node, a network transmission quality between the target static parent node and each dynamic parent node of the at least one dynamic parent node, and sending, by the target static parent node, the stream-pulling request of the target live video stream to a dynamic parent node corresponding to the best network transmission quality.

Optionally, the CDN cluster further includes a central scheduling node, and the method further includes:

receiving, by the central scheduling node, an acquisition request of the target live video stream sent by a viewer terminal;

sending, by the central scheduling node, a stream-pulling query request of the target live video stream to the CCL server through a locally deployed CCL proxy of the central scheduling node; and receiving and forwarding, by the central scheduling node, an acquisition address sent by the CCL server to the viewer terminal, to allow the viewer terminal to obtain the target live video stream according to the acquisition address.

In another aspect, a method for diverting a live video stream is provided. The method includes:

receiving, by a CCL server, video stream information of a target live video stream sent by a target stream-pushing edge node, and storing, by the CCL server, the video stream information of the target live video stream and the target stream-pushing edge node in association;

when the video stream information of the target live video stream sent by a dynamic parent node M is received, determining, by the CCL server, a target stream-pushing edge node corresponding to the video stream information of the target live video stream; and sending, by the CCL server, node identification information of the target stream-pushing edge node to the dynamic parent node M.

Optionally, the method further includes:

receiving, by the CCL server, a stream-pulling query request of the target live video stream sent by a central scheduling node;

determining, by the CCL server, an acquisition address of the target live video stream according to the stream-pulling query request of the target live video stream; and sending, by the CCL server, the acquisition address of the target live video stream to the central scheduling node.

Optionally, the stream-pulling query request of the target live video stream includes the video stream information of the target live video stream; and determining, by the CCL server, the acquisition address of the target live video stream according to the stream-pulling query request of the target live video stream further includes:

determining, by the CCL server, a target stream-pushing edge node that maintains the target live video stream according to the video stream information of the target live video stream;

determining, by the CCL server, whether the number of stream-pulling requests of the target live video stream is greater than a preset threshold;

if the number of stream-pulling requests of the target live video stream is greater than the preset threshold, determining, by the CCL server, a network communication address of a target stream-pulling edge node corresponding to an area to which a viewer terminal belongs as the acquisition address; and if the number of stream-pulling requests of the target live video stream is not greater than the preset threshold, determining, by the CCL server, a network communication address of the target stream-pushing edge node as the acquisition address.

Optionally, the stream-pulling query request of the target live video stream includes network information of a viewer terminal and the video stream information of the target live video stream; and determining, by the CCL server, the acquisition address of the target live video stream according to the video stream information of the target live video stream further includes:

determining, by the CCL server, a target stream-pushing edge node that maintains the target live video stream according to the video stream information of the target live video stream;

determining, by the CCL server, whether the number of stream-pulling requests of the target live video stream is greater than a preset threshold;

if the number of stream-pulling requests of the target live video stream is greater than the preset threshold, determining, by the CCL server, a network communication address of a target stream-pulling edge node corresponding to an area to which the viewer terminal belongs as the acquisition address, and if the number of stream-pulling requests of the target live video stream is not greater than the preset threshold, determining, according to the network information of the viewer terminal and network information of the target stream-pushing edge node, whether a network transmission quality between the viewer terminal and the target stream-pushing edge node is greater than a preset quality level;

if the network transmission quality between the viewer terminal and the target stream-pushing edge node is greater than the preset quality level, determining, by the CCL server, a network communication address of the target stream-pushing edge node as the acquisition address, and if the network transmission quality between the viewer terminal and the target stream-pushing edge node is not greater than the preset quality level, determining, by the CCL server, the network communication address of the target stream-pulling edge node as the acquisition address.

In another aspect, a CCL server for diverting a live video stream is provided. The CCL server is configured to:

receive video stream information of a target live video stream sent by a target stream-pushing edge node, and store the video stream information of the target live video stream and the target stream-pushing edge node in association;

when the video stream information of the target live video stream sent by a dynamic parent node M is received, determine a target stream-pushing edge node corresponding to the video stream information of the target live video stream; and send node identification information of the target stream-pushing edge node to the dynamic parent node M.

Optionally, the CCL server is further configured to:

receive a stream-pulling query request of the target live video stream sent by a central scheduling node;

determine an acquisition address of the target live video stream according to the stream-pulling query request of the target live video stream; and send the acquisition address of the target live video stream to the central scheduling node.

Optionally, the stream-pulling query request includes the video stream information of the target live video stream; and the CCL server is further configured to:

determine, according to the video stream information of the target live video stream, a target stream-pushing edge node that maintains the target live video stream, determine whether the number of stream-pulling requests of the target live video stream is greater than a preset threshold, if the number of stream-pulling requests of the target live video stream is greater than the preset threshold, determine a network communication address of a target stream-pulling edge node corresponding to an area to which the viewer terminal belongs as the acquisition address, and if the number of stream-pulling requests of the target live video stream is not greater than the preset threshold, determine a network communication address of the target stream-pushing edge node as the acquisition address.

Optionally, the stream-pulling query request includes network information of a viewer terminal and the video stream information of the target live video stream; and the CCL server is further configured to:

determine, according to the video stream information of the target live video stream, a target stream-pushing edge node that maintains the target live video stream, determine whether the number of stream-pulling requests of the target live video stream is greater than a preset threshold, if the number of stream-pulling requests of the target live video stream is greater than the preset threshold, determine a network communication address of a target stream-pulling edge node corresponding to an area to which the viewer terminal belongs as the acquisition address, if the number of stream-pulling requests of the target live video stream is not greater than the preset threshold, determine, according to the network information of the viewer terminal and network information of the target stream-pushing edge node, whether a network transmission quality between the viewer terminal and the target stream-pushing edge node is greater than a preset quality level, if the network transmission quality between the viewer terminal and the target stream-pushing edge node is greater than the preset quality level, determine a network communication address of the target stream-pushing edge node as the acquisition address, and if the network transmission quality between the viewer terminal and the target stream-pushing edge node is not greater than the preset quality level, determine the network communication address of the target stream-pulling edge node as the acquisition address.

In another aspect, a system for diverting a live video stream is provided. The system includes the above-described CDN cluster and the above-described CCL server.

The beneficial effects brought by the technical solutions provided by the embodiments of the present disclosure are as follows.

In the embodiments of the present disclosure, the target stream-pushing edge node receives and maintains the target live video stream pushed by the anchor terminal, and reports the video stream information of the target live video stream to the CCL server through the locally deployed CCL proxy. When a stream-pulling request for the target live video stream sent by the target static parent node is received, the dynamic parent node M determines whether the target live video stream is maintained locally. If the target live video stream is not maintained locally, the dynamic parent node M determines a target stream-pushing edge node from the CCL server through the locally deployed CCL proxy. The dynamic parent node M pulls the target live video stream from the target stream-pushing edge node, and feeds back the target live video stream to the target static parent node. In this way, each live video stream is initially maintained only by a stream-pushing edge node, and is diverted through the CDN cluster only when viewed by a viewer, thereby saving the data transmission resource of the CDN cluster.

BRIEF DESCRIPTION OF THE DRAWINGS

To make the technical solutions in the embodiments of the present disclosure clearer, a brief introduction of the accompanying drawings consistent with descriptions of the embodiments will be provided hereinafter. It is to be understood that the following described drawings are merely some embodiments of the present disclosure. Based on the accompanying drawings and without creative efforts, persons of ordinary skill in the art may derive other drawings.

DETAILED DESCRIPTION

To make the objective, technical solutions, and advantages of the present disclosure clearer, the implementations of the present disclosure will be made in detail hereinafter with reference to the accompanying drawings.

Figure 1:
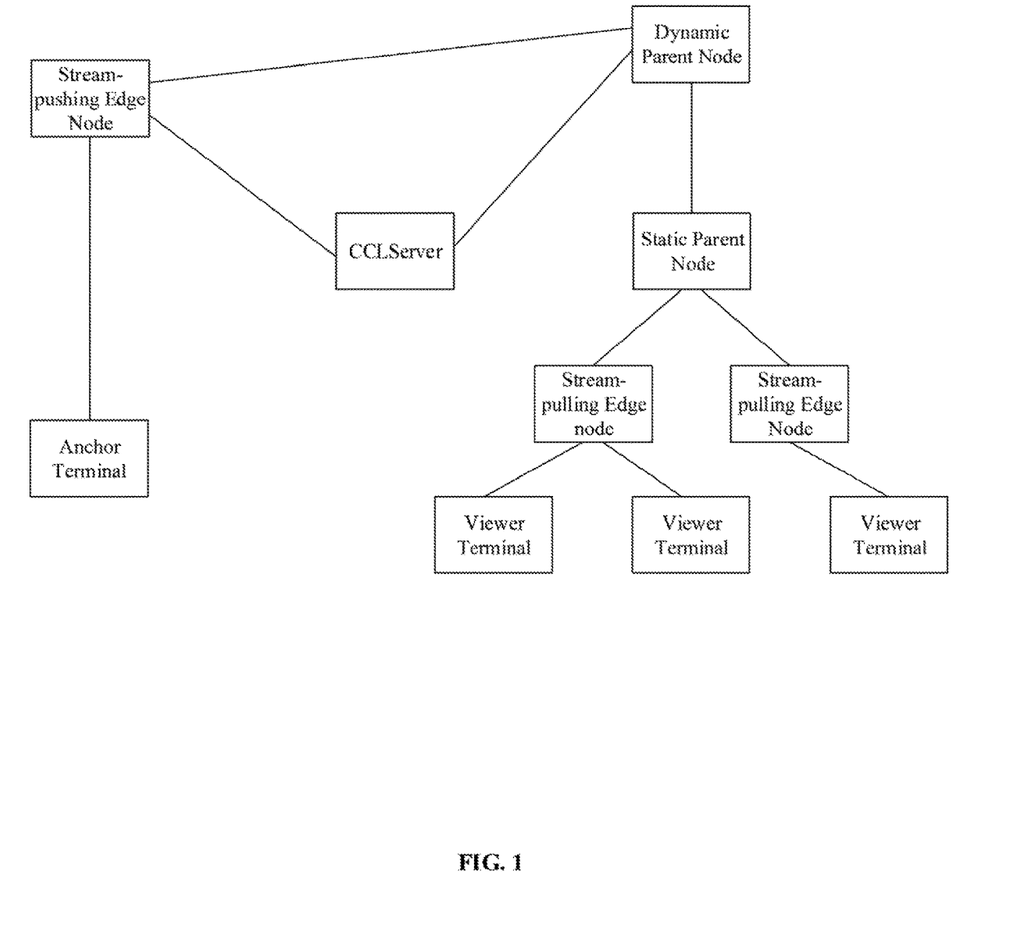
FIG. 1 is a schematic diagram of a scenario frame of a live streaming acceleration system according to some embodiments of the present disclosure.

The embodiments of the present disclosure provide a method for diverting a live video stream. The method is applied to a live streaming acceleration system, where the live streaming acceleration system includes a CDN cluster and a CCL server. As shown in FIG. 1, the CDN cluster includes a plurality of CDN nodes, which may include at least an edge node, a static parent node, and a dynamic parent node. An edge node may be a node in the CDN cluster that is closest to the user side. Each edge node may independently provide CDN service to users in an area, and may perform data exchange directly with user terminals. For example, a stream-pushing edge node may receive a live video stream pushed by an anchor terminal, while a stream-pulling edge node may provide a live video stream to viewer terminals. A static parent node is a node at an upper-level of the edge nodes. Each static parent node may serve multiple edge nodes, and is configured to pull a live video stream from a dynamic parent node, and provide the live video stream to the multiple edge nodes. A dynamic parent node may be a node at an upper-level of a static parent node, and is configured to pull a live video stream from an edge node and provide the live video stream to the static parent node. Each node of the CDN cluster is deployed with a CCL proxy, through which to exchange data with the CCL server. The CCL server may be configured to store video stream information of live video streams currently maintained by each edge node. The foregoing CDN nodes and the CCL server may each include a processor, a memory, and/or a transceiver. The processor may be configured to process stream-diverting of the live video streams in the following process, the memory may be used to store data required and generated in the process, and the transceiver may be configured to receive and transmit relevant data during the process.

Figure 2:
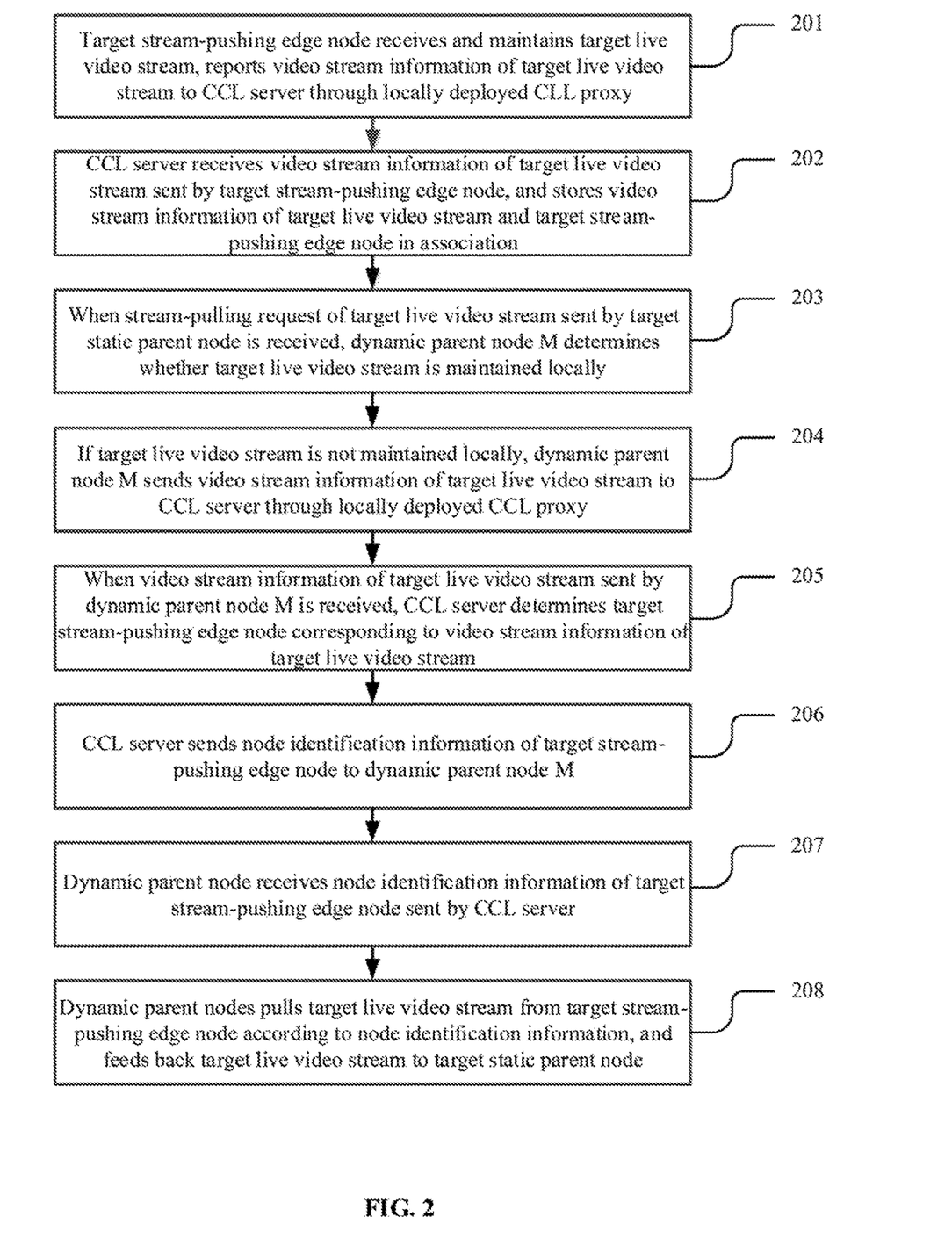
FIG. 2 is a flowchart of a method for diverting a live video stream according to some embodiments of the present disclosure.

The flowchart shown in FIG. 2 will be described in detail hereinafter in conjunction with specific implementations, which may be as follows.

Step 201: a target stream-pushing edge node receives and maintains a target live video stream pushed by an anchor terminal, and reports video stream information of the target live video stream to a CCL server through a locally deployed CCL proxy.

In the implementation, after the operator of a live streaming platform purchases the CDN service, in the process of recording and uploading a live video, an anchor terminal of the live streaming platform may push the corresponding live video stream (e.g., a target live video stream) to a stream-pushing edge node (e.g., a target stream-pushing edge node) of the CDN cluster corresponding to the area where the anchor terminal is located. Accordingly, the target stream-pushing edge node may receive the target live video stream pushed by the anchor terminal, and maintain the target live video stream. At the same time, the target stream-pushing edge node may extract the video stream information of the target live video stream. The video stream information may include the stream identifier of the target live video stream, the identifier of the anchor terminal, and the node identification information of the target stream-pushing edge node, etc. Afterwards, the target stream-pushing edge node may report the video stream information of the target live video stream to the CCL server through the locally deployed CCL agent.

Step 202: the CCL server receives the video stream information of the target live video stream sent by the target stream-pushing edge node, and stores the video stream information of the target live video stream and the target stream-pushing edge node in association.

In the implementation, the CCL server may receive the video stream information of the target live video stream sent by the target stream-pushing edge node, and store the video stream information of the target live video stream in association with the target stream-pushing edge node. Further, the CCL server may store an association relationship between the video stream information and the stream-pushing edge nodes, so the video stream information of the target live video stream and the target stream-pushing edge node may be added to the association relationship.

Step 203: when a stream-pulling request of the target live video stream sent by a target static parent node is received, a dynamic parent node M determines whether the target live video stream is maintained locally.

In the implementation, when there is a live streaming viewer who wants to view the live video in Step 201, a stream-pulling request for the target live video stream may reach a dynamic parent node of the CDN cluster through the viewer terminal, the stream-pulling edge node, and the static parent node, so that the dynamic parent node may respond to the stream-pulling request. Specifically, taking a dynamic parent node M as an example, when a stream-pulling request of the target live video stream sent by the target static parent node is received, the dynamic parent node M may first determine whether the target live video stream is maintained locally.

Step 204: if the target live video stream is not maintained locally, the dynamic parent node M sends the video stream information of the target live video stream to the CCL server through a locally deployed CCL proxy.

In the implementation, if the target live video stream is not maintained locally, the dynamic parent node M may interact with the CCL server through the locally deployed CCL proxy, and send the video stream information of the target live video stream to the CCL server.

Step 205: when the video stream information of the target live video stream sent by the dynamic parent node M is received, the CCL server determines the target stream-pushing edge node corresponding to the video stream information of the target live video stream.

In the implementation, when the video stream information of the target live video stream sent by the dynamic parent node M is received, the CCL server may first determine the target stream-pushing edge node corresponding to the locally stored video stream information of the target live video stream. Specifically, the CCL server may refer to the association relationship between the locally stored video stream information and the stream-pushing edge nodes, and determine the target stream-pushing edge node corresponding to the video stream information of the target live video stream based on the association relationship.

Step 206: the CCL server sends the node identification information of the target stream-pushing edge node to the dynamic parent node M.

The node identification information may be information such as a network communication address of the stream-pushing edge node, a node number, and/or a device code of the node device.

Step 207: the dynamic parent node M receives the node identification information of the target stream-pushing edge node sent by the CCL server.

Step 208: the dynamic parent node M pulls the target live video stream from the target stream-pushing edge node according to the node identification information, and feeds back the target live video stream to the target static parent node.

In the implementation, after receiving the node identification information of the target stream-pushing edge node that maintains the target live video stream, the dynamic parent node M may determine the network communication address of the target stream-pushing edge node according to the node identification information. Based on the network communication address, the dynamic parent node M may access the target stream-pushing edge node, and pull the target live video stream from the target stream-pushing edge node, and then feed back the target live video stream to the target static parent node. Apparently, if the target live video stream is maintained in the dynamic parent node M, the dynamic parent node M may directly feed the locally maintained target live video stream to the target static parent node.

Figure 3:
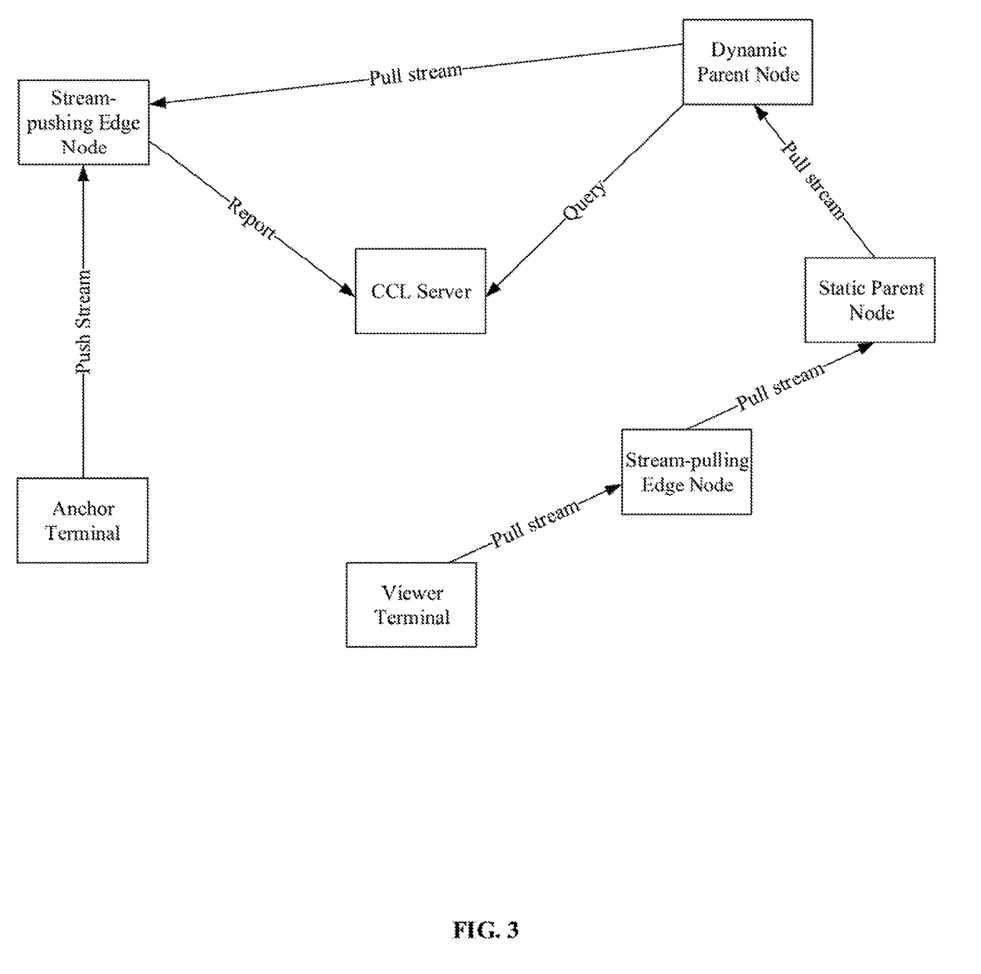
FIG. 3 is an interactive diagram of a method for diverting a live video stream according to some embodiments of the present disclosure.

The interaction process between the devices for the foregoing Steps 201-208 may be as shown in FIG. 3.

Optionally, in addition to Steps 201-208 in which the dynamic parent node extracts the live video stream from the stream-pushing edge node, the stream-pushing edge node may also actively push a really hot live video stream to the dynamic parent node. The process may be as follows: the target stream-pushing edge node determines an anchor level corresponding to the target live video stream; if the anchor level is greater than a preset active stream-pushing level, the target stream-pushing edge node may determine a dynamic parent node N according to the preset algorithm and the video stream information of the target live video stream; and the target stream-pushing edge node pushes the target live video stream to the dynamic parent node N.

In the implementation, the live streaming acceleration system may pre-classify the anchors into multiple anchor levels according to the number of viewers. The higher the number of viewers, the higher the anchor level, and the higher the popularity of the corresponding live video stream. Each node device of the CDN cluster may be deployed with the classification result for the above-described anchor level. In this way, after receiving a target live video stream uploaded by an anchor terminal, the target stream-pushing edge node may determine the anchor level corresponding to the target live video stream. If the anchor level is greater than a preset active stream-pushing level, the target stream-pushing edge node may determine the dynamic parent node N according to the preset algorithm and the video stream information of the target live video stream, and then actively push the target live video stream to the dynamic parent node N. Here, the algorithm for determining the dynamic parent node may be uniformly configured in advance in all the nodes of the CDN cluster by the technical staff of the live streaming acceleration system, and the algorithm may be a hash algorithm. Specifically, the above determining process may be performed by hashing the video-playing address of the live video stream to obtain network communication addresses of two dynamic parent nodes with a sequential order, and the first dynamic parent node may be selected.

Optionally, the static parent node may select a dynamic parent node for backing to the source based on the network transmission quality. The corresponding process may be as follows: the target static parent node receives a stream-pulling request of the target live video stream sent by the target stream-pulling edge node, the target static parent node determines at least one dynamic parent node according to the preset algorithm and the video stream information of the target live video stream, the target static parent node checks the network transmission quality between the target static parent node and each dynamic parent node among the at least one dynamic parent node, and sends the stream-pulling request of the target live video stream to a dynamic parent node corresponding to the best network transmission quality.

In the implementation, after the target static parent node receives the stream-pulling request of the target live video stream sent by the target stream-pulling edge node, the target static parent node may determine at least one dynamic parent node according to the preset algorithm and the video stream information of the target live video stream. Thereafter, the target static parent node may check the network transmission quality between the target static parent node and each dynamic parent node among the at least one dynamic parent node, and then select a dynamic parent node corresponding to the best network transmission quality, and send the stream-pulling request for the target live video stream to the selected dynamic parent node. Here, the algorithm for determining the dynamic parent node may be uniformly configured in advance in all the nodes of the CDN cluster by the technical staff of the live streaming acceleration system, and the algorithm may be a hash algorithm. Specifically, the above determining process may be performed by hashing the video-playing address of the live video stream to obtain the network communication addresses of at least one dynamic parent node with a sequential order. It should be noted that the process of determining the dynamic parent node by the static parent node may be consistent with the process of determining the dynamic parent node by the stream-pushing edge node. In this way, it can be ensured that the static parent node may preferentially pull a live video stream from a dynamic parent node that maintains the live video stream. Apparently, under another stream-pulling mechanism, the static parent node may preferentially pull the live video stream from a determined first dynamic parent node. When the network quality between the static parent node and the first dynamic parent node is lower than a certain level, the static parent node then pulls the live video stream from a second dynamic parent node. If there are other dynamic parent nodes, the dynamic parent node-reversing process may be continued according to the above process.

Optionally, the live streaming acceleration system may also include a central scheduling node. Correspondingly, the diverting process involving the central scheduling node may refer to the flowchart shown in FIG. 4.

Figure 4:
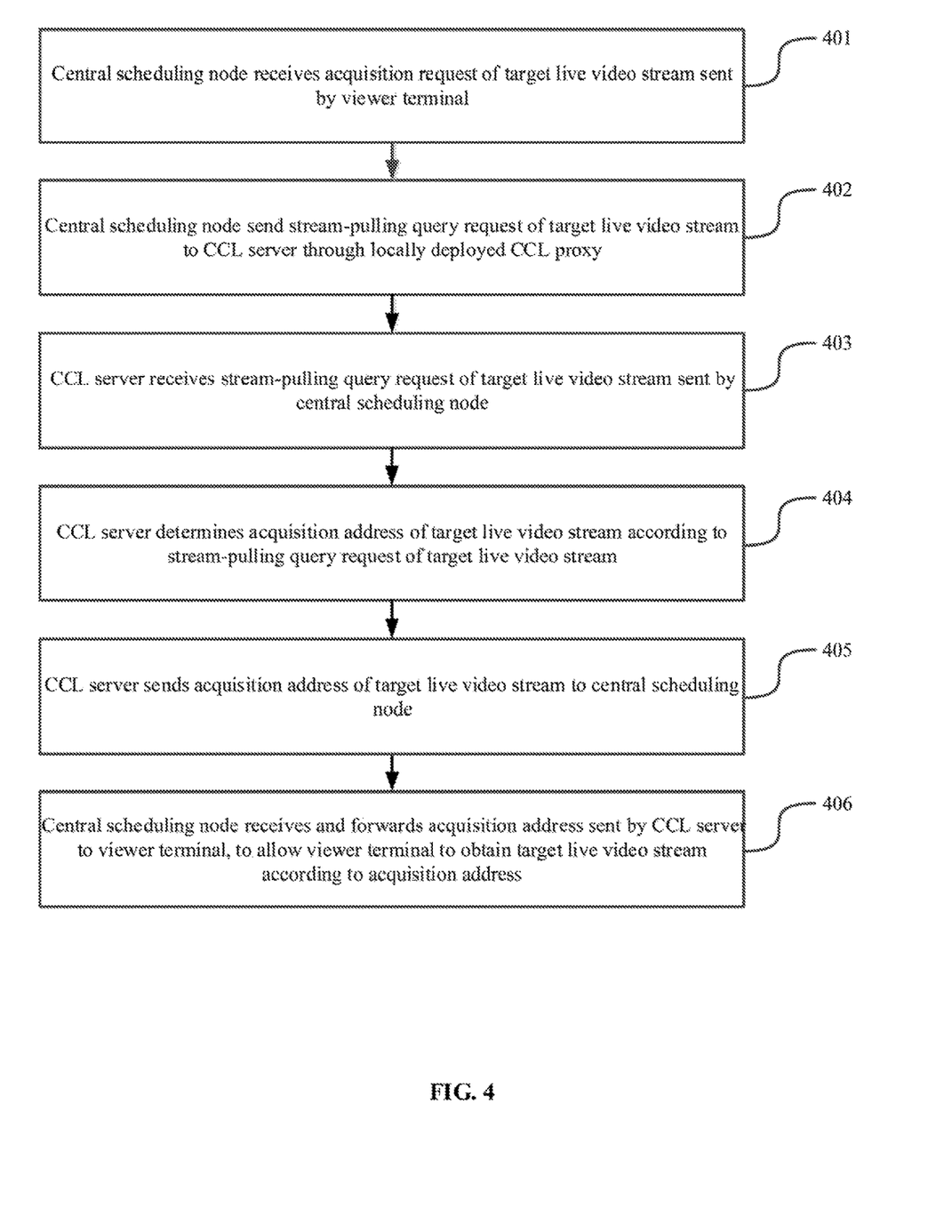
FIG. 4 is a flowchart of another method for diverting a live video stream according to some embodiments of the present disclosure.

Step 401: the central scheduling node receives an acquisition request of the target live video stream sent by the viewer terminal.

In the implementation, when a user wants to watch a live video, the user may trigger, through user operations, a viewer terminal to send an acquisition request for the corresponding live video stream (e.g., the target live video stream) to the backend system of the live streaming platform. The DNS system may first receive the acquisition request, and convert the target domain name of the acquisition request to the network communication address of the central scheduling node of the CDN cluster, and then return the converted acquisition request to the viewer terminal, to trigger the viewer terminal to send the above acquisition request to the central scheduling node. Thereafter, the central scheduling node may receive the acquisition request of the target live video stream sent by the viewer terminal.

Step 402: the central scheduling node sends a stream-pulling query request of the target live video stream to the CCL server through the locally deployed CCL proxy.

Step 403: the CCL server receives the stream-pulling query request of the target live video stream sent by the central scheduling node.

Step 404: the CCL server determines the acquisition address of the target live video stream according to the stream-pulling query request of the target live video stream.

Optionally, the stream-pulling query request of the target live video stream may include the video stream information of the target live video stream. Correspondingly, the process of Step 404 may be specifically as follows: the CCL server determines the acquisition address of the target live video stream according to the stream-pulling query request of the target live video stream. This includes that: the CCL server determines the target stream-pushing edge node that maintains the target live video stream according to the video stream information of the target live video stream; the CCL server determines whether the number of stream-pulling requests of the target live video stream is greater than a preset threshold; if the number of stream-pulling requests of the target live video stream is greater than the preset threshold, the CCL server determines the network communication address of the target stream-pulling edge node corresponding to the area to which the viewer terminal belongs as the acquisition address; and if the number of stream-pulling requests of the target live video stream is not greater than the preset threshold, the CCL server determines the network communication address of the target stream-pushing edge node as the acquisition address.

In the implementation, the technical staff of the live streaming acceleration system may set in advance a threshold for determining the hotness of a live video. When the number of stream-pulling requests of a live video stream is greater than the preset threshold, the live video stream may be determined to be hot. Otherwise, the live video stream may be determined as a cold stream. Further, different live streaming platforms or different types of live video streams in the same live streaming platform may be respectively set with different thresholds. When determining whether a stream is hot or not, a corresponding preset threshold may be first determined based on the live streaming platform and/or the type of the live video stream, then the hotness of the live video stream is further determined based on the preset threshold.

Accordingly, after receiving the stream-pulling query request of the target live video stream, the CCL server may extract the video stream information of the target live video stream included in the stream-pulling query request, and determine the target stream-pushing edge node that maintains the target live video stream according to the video stream information. At the same time, the CCL server may also determine whether the number of stream-pulling requests of the target live video stream is greater than a preset threshold. If the number of stream-pulling requests of the target live video stream is greater than the preset threshold, it may indicate that the target live video stream is a hot stream, and the viewer terminal may pull the target live video stream from the nearest stream-pulling edge node. Accordingly, the CCL server may determine the network communication address of the target stream-pulling edge node corresponding to the area to which the viewer terminal belongs as the acquisition address. If the number of stream-pulling requests of the target live video stream is not greater than the preset threshold, it may indicate that the target live video stream is not a hot stream. The viewer terminal may directly perform data exchange with the target stream-pushing edge node. Accordingly, the CCL server may determine the network communication address of the target stream-pushing edge node as the acquisition address. In another situation, the CCL server may merely feed back the number of stream-pulling requests of the target live video stream recorded by the target stream-pushing edge node to the central scheduling node. The subsequent specific process of determining the acquisition address may be accomplished by the central scheduling node. It should be noted that each time the target stream-pushing edge node receives a stream-pulling request for the target live video stream, the request may be reported to the CCL server, to allow the CCL server to update the stored number of stream-pulling requests of the target live video stream.

Optionally, the stream-pulling query request of the target live video stream may include the network information of the viewer terminal and the video stream information of the target live video stream. Correspondingly, the process of Step 404 may be specifically as follows: the CCL server determines the target stream-pushing edge node that maintains the target live video stream according to the video stream information of the target live video stream; the CCL server determines whether the number of stream-pulling requests of the target live video stream is greater than a preset threshold; if the number of stream-pulling requests of the target live video stream is greater than the preset threshold, the CCL server determines the network communication address of the target stream-pulling edge node corresponding to the area to which the viewer terminal belongs as the acquisition address; if the number of stream-pulling requests of the target live video stream is not greater than the preset threshold, the CCL server determines, according to the network information of the viewer terminal and the network information of the target stream-pushing edge node, whether the network transmission quality between the viewer terminal and the target stream-pushing edge node is greater than a preset quality level; if the network transmission quality is greater than the preset quality level, the CCL server determines the network communication address of the target stream-pushing edge node as the acquisition address, if the network transmission quality is not greater than the preset quality level, the network communication address of the target stream-pulling edge node is determined as the acquisition address.

In the implementation, after receiving the network information (e.g., the network communication address, the operator to which the network belongs, the area to which the network belongs, etc.) of the viewer terminal and the video stream information of the target live video stream, the CCL server may firstly use the video stream information of the target live video stream to determine the target stream-pushing edge node that maintains the target live video stream, and then determine whether the number of stream-pulling requests of the target live video stream is greater than a preset threshold. If the number of stream-pulling requests of the target live video stream is greater than the preset threshold, it may indicate that the target live video stream is a hot stream, and the viewer terminal may pull the target live video stream from the nearest stream-pulling edge node. Accordingly, the CCL server may determine the network communication address of the target stream-pulling edge node corresponding to the area to which the viewer terminal belongs as the acquisition address. If the number of stream-pulling requests of the target live video stream is not greater than the preset threshold, it may indicate that the target live video stream is not a hot stream, and thus the network transmission quality between the viewer terminal and the target stream-pushing edge node needs to be further determined. Accordingly, the CCL server may determine, according to the network information of the viewer terminal and the network information of the target stream-pushing edge node, whether the network transmission quality between the viewer terminal and the target stream-pushing edge node is greater than a preset quality level. If the network transmission quality between the viewer terminal and the target stream-pushing edge node is greater than the preset quality level, the viewer terminal may directly perform data exchange with the target stream-pushing edge node, and thus the CCL server may determine the network communication address of the target stream-pushing edge node as the acquisition address. If the network transmission quality between the viewer terminal and the target stream-pushing edge node is not greater than the preset quality level, the viewer terminal will obtain the target live video stream through the CDN cluster; then the CCL server may determine the network communication address of the target stream-pulling edge node as the acquisition address. In another situation, the CCL server may merely feed back the number of stream-pulling requests of the target live video stream recorded by the target stream-pushing edge node to the central scheduling node. The subsequent specific process of determining the acquisition address may be accomplished by the central scheduling node.

Step 405: the CCL server sends the acquisition address of the target live video stream to the central scheduling node.

Step 406: the central scheduling node receives and forwards the acquisition address sent by the CCL server to the viewer terminal, to allow the viewer terminal to obtain the target live video stream according to the acquisition address.

Figure 5:
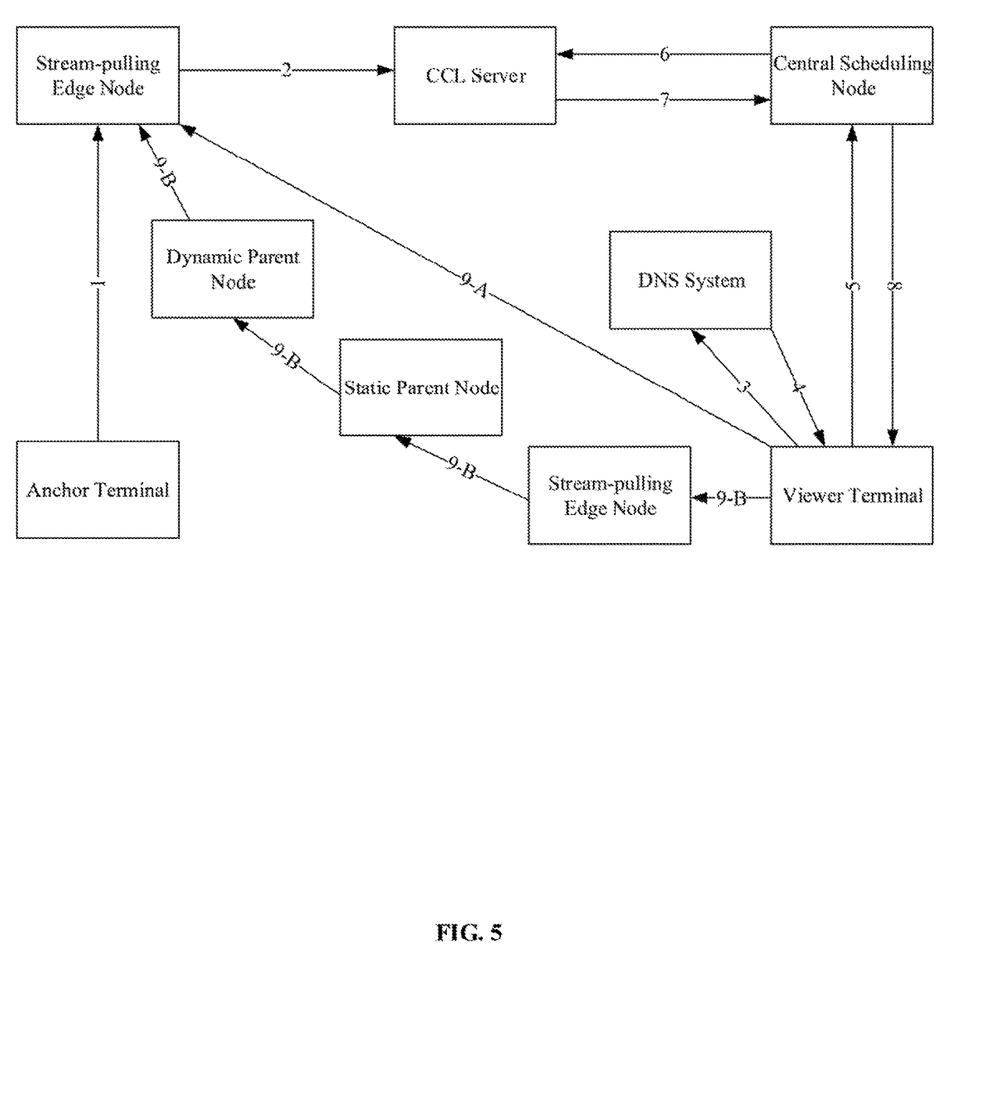
FIG. 5 is an interactive diagram of another method for diverting a live video stream according to some embodiments of the present disclosure.

The interaction process of the above Steps 401-406 may be as shown in FIG. 5.

In the embodiments of the present disclosure, the target stream-pushing edge node receives and maintains the target live video stream pushed by the anchor terminal, and reports the video stream information of the target live video stream to the CCL server through the locally deployed CCL proxy. When a stream-pulling request for the target live video stream sent by the target static parent node is received, the dynamic parent node M determines whether the target live video stream is maintained locally. If the target live video stream is not maintained locally, the dynamic parent node M determines a target stream-pushing edge node from the CCL server through the locally deployed CCL proxy. The dynamic parent node M pulls the target live video stream from the target stream-pushing edge node, and feeds back the target live video stream to the target static parent node. In this way, each live video stream is initially maintained only by a stream-pushing edge node, and is diverted through the CDN cluster only when viewed by a viewer, thereby saving the data transmission resource of the CDN cluster.

Based on the similar technical concept, the embodiments of the present disclosure further provide a CCL server for diverting a live video stream, where the CCL server is configured to:

receive video stream information of a target live video stream sent by a target stream-pushing edge node, and store the video stream information of the target live video stream and the target stream-pushing edge node in association;

when the video stream information of the target live video stream sent by a dynamic parent node M is received, determine a target stream-pushing edge node corresponding to the video stream information of the target live video stream; and send node identification information of the target stream-pushing edge node to the dynamic parent node M.

Optionally, the CCL server is further configured to:

receive a stream-pulling query request of the target live video stream sent by a central scheduling node;

determine an acquisition address of the target live video stream according to the stream-pulling query request of the target live video stream; and send the acquisition address of the target live video stream to the central scheduling node.

Optionally, the stream-pulling query request includes the video stream information of the target live video stream; and the CCL server is further configured to:

determine, according to the video stream information of the target live video stream, a target stream-pushing edge node that maintains the target live video stream, determine whether the number of stream-pulling requests of the target live video stream is greater than a preset threshold, if the number of stream-pulling requests of the target live video stream is greater than the preset threshold, determine a network communication address of a target stream-pulling edge node corresponding to an area to which the viewer terminal belongs as the acquisition address, and if the number of stream-pulling requests of the target live video stream is not greater than the preset threshold, determine a network communication address of the target stream-pushing edge node as the acquisition address.

Optionally, the stream-pulling query request includes network information of a viewer terminal and the video stream information of the target live video stream; and the CCL server is further configured to:

determine, according to the video stream information of the target live video stream, a target stream-pushing edge node that maintains the target live video stream, determine whether the number of stream-pulling requests of the target live video stream is greater than a preset threshold, if the number of stream-pulling requests of the target live video stream is greater than the preset threshold, determine a network communication address of a target stream-pulling edge node corresponding to an area to which the viewer terminal belongs as the acquisition address, if the number of stream-pulling requests of the target live video stream is not greater than the preset threshold, determine, according to the network information of the viewer terminal and network information of the target stream-pushing edge node, whether a network transmission quality between the viewer terminal and the target stream-pushing edge node is greater than a preset quality level, if the network transmission quality between the viewer terminal and the target stream-pushing edge node is greater than the preset quality level, determine a network communication address of the target stream-pushing edge node as the acquisition address, and if the network transmission quality between the viewer terminal and the target stream-pushing edge node is not greater than the preset quality level, determine the network communication address of the target stream-pulling edge node as the acquisition address.

Based on the similar technical concept, the embodiments of the present disclosure further provide a system for diverting a live video stream. The system includes a CDN cluster and a CCL server, where the functions of the CDN cluster and the CCL server may refer to the foregoing Steps 201-208 and Steps 401-406.

Figure 6:
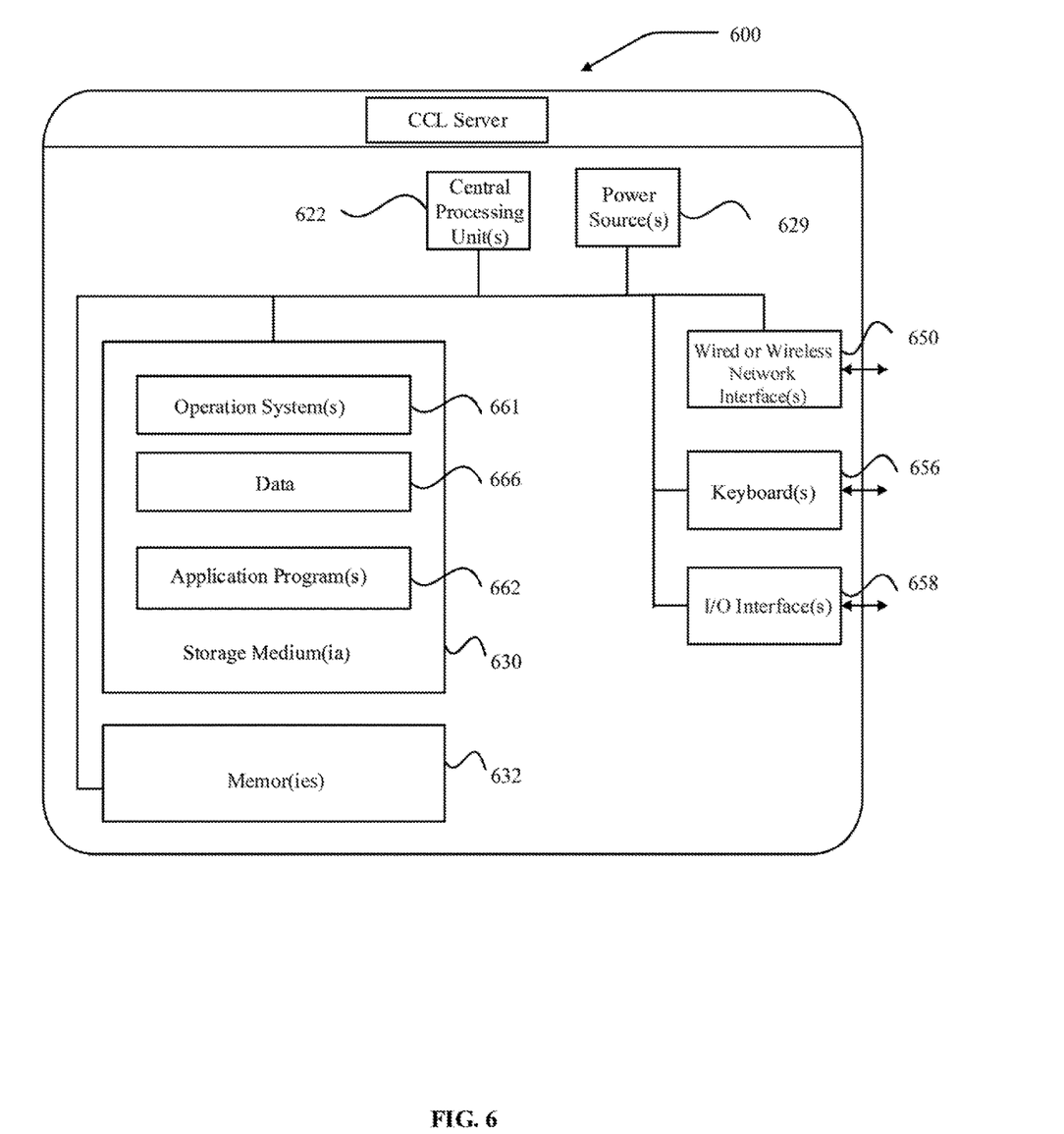
FIG. 6 is a schematic structural diagram of a CCL server according to some embodiments of the present disclosure.

FIG. 6 is a schematic structural diagram of a CCL server according to some embodiments of the present disclosure. The CCL server 600 may vary considerably depending on the configuration or performance, and may include one or more central processing units 622 (e.g., one or more processors) and memories 632, and one or more storage media 630 (e.g., one or one mass storage devices) for storing application programs 662 or data 666. Here, the memories 632 and the storage media 630 may be a volatile storage device or a non-volatile storage device. The programs stored on the storage media 630 may include one or more modules (not shown), each of which may include a series of instructions for the CCL server. Further, the central processing units 622 may be configured to communicate with the storage media 630, and implement, on the CCL server 600, a series of instructions stored in the storage medium 630.

The CCL server 600 may further include one or more power sources 626, one or more wired or wireless network interfaces 650, one or more input and output interfaces 658, one or more keyboards 656, and/or one or more operating systems 661, such as Windows Server™, Mac OS X™, Unix™, Linux™, FreeBSD™, etc.

The CCL server 600 may include a memory and one or more programs, where the one or more programs are stored in the memory and configured to be executed by one or more processors. The one or more programs include the instructions that are configured to divert a live video stream as described above.

A person skilled in the art may understand that all or part of the steps of the above embodiments may take the form of hardware implementation, or take the form of implementation of programs for directing the relevant hardware. The programs may be stored in a computer-readable storage medium. The storage medium may be a read-only memory, a magnetic disk, or an optical disk, etc.

Although the present disclosure has been described with reference to preferred embodiments, these embodiments should not be constructed as limiting the present disclosure. Any modifications, equivalent replacements, and improvements made without departing from the spirit and principle of the present disclosure shall fall within the scope of the protection of the present disclosure.

What is claimed is:

1. A method for diverting a live video stream, the method being applied to a CDN cluster wherein each node of the CDN cluster is deployed with a CCL proxy, and the method comprising:

receiving and maintaining, by a target stream-pushing edge node, a target live video stream pushed by an anchor terminal, and reporting, by the target stream-pushing edge node, video stream information of the target live video stream to a CCL server through a locally deployed CCL proxy of the target stream-pushing edge node;

when a stream-pulling request of the target live video stream sent by a target static parent node is received, determining, by a dynamic parent node M, whether the target live video stream is maintained locally;

if the target live video stream is not maintained locally, sending, by the dynamic parent node M, the video stream information of the target live video stream to the CCL server through a locally deployed CCL proxy of the dynamic parent node M;

receiving, by the dynamic parent node M, node identification information of the target stream-pushing edge node sent by the CCL server; and pulling, by the dynamic parent node M, the target live video stream from the target stream-pushing edge node according to the node identification information, and feeding back, by the dynamic parent node M, the target live video stream to the target static parent node.

2. The method according to claim 1, further comprising:
determining, by the target stream-pushing edge node, an anchor level corresponding to the target live video stream;
if the anchor level is greater than a preset active stream-pushing level, determining, by the target stream-pushing edge node, a dynamic parent node N according to a preset algorithm and the video stream information of the target live video stream; and
pushing, by the target stream-pushing edge node, the target live video stream to the dynamic parent node N.

3. The method according to claim 1, further comprising:
receiving, by the target static parent node, the stream-pulling request of the target live video stream sent by a target stream-pulling edge node;
determining, by the target static parent node, at least one dynamic parent node according to a preset algorithm and the video stream information of the target live video stream; and
detecting, by the target static parent node, a network transmission quality between the target static parent node and each dynamic parent node of the at least one dynamic parent node, and sending, by the target static parent node, the stream-pulling request of the target live video stream to a dynamic parent node corresponding to the best network transmission quality.

4. The method according to claim 1, wherein the CDN cluster further includes a central scheduling node, and the method further includes:
receiving, by the central scheduling node, an acquisition request of the target live video stream sent by a viewer terminal;
sending, by the central scheduling node, a stream-pulling query request of the target live video stream to the CCL server through a locally deployed CCL proxy of the central scheduling node; and
receiving and forwarding, by the central scheduling node, an acquisition address sent by the CCL server to the viewer terminal, to allow the viewer terminal to obtain the target live video stream according to the acquisition address.

5. A method for diverting a live video stream, comprising:
receiving, by a CCL server, video stream information of a target live video stream sent by a target stream-pushing edge node, and storing, by the CCL server, the video stream information of the target live video stream and the target stream-pushing edge node in association;
when the video stream information of the target live video stream sent by a dynamic parent node M is received, determining, by the CCL server, a target stream-pushing edge node corresponding to the video stream information of the target live video stream; and sending, by the CCL server, node identification information of the target stream-pushing edge node to the dynamic parent node M.

6. The method according to claim 5, further comprising:
receiving, by the CCL server, a stream-pulling query request of the target live video stream sent by a central scheduling node;
determining, by the CCL server, an acquisition address of the target live video stream according to the stream-pulling query request of the target live video stream; and
sending, by the CCL server, the acquisition address of the target live video stream to the central scheduling node.

7. The method according to claim 6, wherein the stream-pulling query request of the target live video stream includes the video stream information of the target live video stream, and determining, by the CCL server, the acquisition address of the target live video stream according to the stream-pulling query request of the target live video stream further includes:
determining, by the CCL server, a target stream-pushing edge node that maintains the target live video stream according to the video stream information of the target live video stream;
determining, by the CCL server, whether the number of stream-pulling requests of the target live video stream is greater than a preset threshold;
if the number of stream-pulling requests of the target live video stream is greater than the preset threshold, determining, by the CCL server, a network communication address of a target stream-pulling edge node corresponding to an area to which a viewer terminal belongs as the acquisition address; and
if the number of stream-pulling requests of the target live video stream is not greater than the preset threshold, determining, by the CCL server, a network communication address of the target stream-pushing edge node as the acquisition address.

8. The method according to claim 6, wherein the stream-pulling query request of the target live video stream includes network information of a viewer terminal and the video stream information of the target live video stream, and determining, by the CCL server, the acquisition address of the target live video stream according to the video stream information of the target live video stream further includes:
determining, by the CCL server, a target stream-pushing edge node that maintains the target live video stream according to the video stream information of the target live video stream;
determining, by the CCL server, whether the number of stream-pulling requests of the target live video stream is greater than a preset threshold;
if the number of stream-pulling requests of the target live video stream is greater than the preset threshold, determining, by the CCL server, a network communication address of a target stream-pulling edge node corresponding to an area to which the viewer terminal belongs as the acquisition address;
if the number of stream-pulling requests of the target live video stream is not greater than the preset threshold, determining, according to the network information of the viewer terminal and network information of the target stream-pushing edge node, whether a network transmission quality between the viewer terminal and the target stream-pushing edge node is greater than a preset quality level;

if the network transmission quality between the viewer terminal and the target stream-pushing edge node is greater than the preset quality level, determining, by the CCL server, a network communication address of the target stream-pushing edge node as the acquisition address; and if the network transmission quality between the viewer terminal and the target stream-pushing edge node is not greater than the preset quality level, determining, by the CCL server, the network communication address of the target stream-pulling edge node as the acquisition address.

9. A CCL server for diverting a live video stream, the CCL server being configured to:

receive video stream information of a target live video stream sent by a target stream-pushing edge node, and store the video stream information of the target live video stream and the target stream-pushing edge node in association;

when the video stream information of the target live video stream sent by a dynamic parent node M is received, determine a target stream-pushing edge node corresponding to the video stream information of the target live video stream; and send node identification information of the target stream-pushing edge node to the dynamic parent node M.

10. The CCL server according to claim 9, the CCL server being further configured to:

receive a stream-pulling query request of the target live video stream sent by a central scheduling node;

determine an acquisition address of the target live video stream according to the stream-pulling query request of the target live video stream; and send the acquisition address of the target live video stream to the central scheduling node.

11. The CCL server according to claim 10, wherein the stream-pulling query request includes the video stream information of the target live video stream, and the CCL server is further configured to:

determine, according to the video stream information of the target live video stream, a target stream-pushing edge node that maintains the target live video stream, determine whether the number of stream-pulling requests of the target live video stream is greater than a preset threshold, if the number of stream-pulling requests of the target live video stream is greater than the preset threshold, determine a network communication address of a target stream-pulling edge node corresponding to an area to which the viewer terminal belongs as the acquisition address, and if the number of stream-pulling requests of the target live video stream is not greater than the preset threshold, determine a network communication address of the target stream-pushing edge node as the acquisition address.

12. The CCL server according to claim 10, wherein the stream-pulling query request includes network information of a viewer terminal and the video stream information of the target live video stream, and the CCL server is further configured to:

determine, according to the video stream information of the target live video stream, a target stream-pushing edge node that maintains the target live video stream, determine whether the number of stream-pulling requests of the target live video stream is greater than a preset threshold, if the number of stream-pulling requests of the target live video stream is greater than the preset threshold, determine a network communication address of a target stream-pulling edge node corresponding to an area to which the viewer terminal belongs as the acquisition address, if the number of stream-pulling requests of the target live video stream is not greater than the preset threshold, determine, according to the network information of the viewer terminal and network information of the target stream-pushing edge node, whether a network transmission quality between the viewer terminal and the target stream-pushing edge node is greater than a preset quality level, if the network transmission quality between the viewer terminal and the target stream-pushing edge node is greater than the preset quality level, determine a network communication address of the target stream-pushing edge node as the acquisition address, and if the network transmission quality between the viewer terminal and the target stream-pushing edge node is not greater than the preset quality level, determine the network communication address of the target stream-pulling edge node as the acquisition address.

* * * * *